United States Patent
Hui et al.

(10) Patent No.: US 11,137,355 B2
(45) Date of Patent: Oct. 5, 2021

(54) PROCESS AND SYSTEM FOR DIAMOND CLARITY MEASUREMENT

(71) Applicant: Goldway Technology Limited, Hong Kong (HK)

(72) Inventors: Koon Chung Hui, Pak Shek Kok (HK); Ka Wing Cheng, Pak Shek Kok (HK); Wing Chi Tang, Pak Shek Kok (HK)

(73) Assignee: Goldway Technology Limited, Hong Kong (HK)

( * ) Notice: Subject to any disclaimer, the term of this patent is extended or adjusted under 35 U.S.C. 154(b) by 0 days.

(21) Appl. No.: 16/942,696

(22) Filed: Jul. 29, 2020

(65) Prior Publication Data

US 2021/0033540 A1 Feb. 4, 2021

(30) Foreign Application Priority Data

Jul. 29, 2019 (HK) .................................. 19127404.2

(51) Int. Cl.
*G06K 9/00* (2006.01)
*G01N 21/87* (2006.01)
(Continued)

(52) U.S. Cl.
CPC .......... *G01N 21/87* (2013.01); *G06T 7/0002* (2013.01); *G06T 7/90* (2017.01);
(Continued)

(58) Field of Classification Search
CPC .... G01N 21/87; G01N 2201/062; G06T 7/90; G06T 7/0002; G06T 2207/20081;
(Continued)

(56) References Cited

U.S. PATENT DOCUMENTS 8,878,145 B1 * 11/2014 Liu .................. G01N 21/87
250/461.1
9,953,406 B2 * 4/2018 Verboven .............. G06T 7/0004
(Continued)

FOREIGN PATENT DOCUMENTS

CN 101578618 A 11/2009
CN 102596433 A 7/2012
(Continued)

OTHER PUBLICATIONS

Wang, Jianliang, Authorized Officer, National Intellectual Property Administration, PRC (ISA/CN), "International Search Report" in connection with related International Application No. PCT/CN2020/105431, dated Nov. 2, 2020, 6 pgs.
(Continued)

*Primary Examiner* — Jonathan S Lee
(74) *Attorney, Agent, or Firm* — Kolisch Hartwell, P.C.

(57) ABSTRACT

A process is operable using a computerized system for grading the clarity of a diamond. The computerized system includes an optical image acquisition device, a processor, a pre-trained neural network and an output module operably interconnected together. The process includes: (i) acquiring via an optical image acquisition device one or more plural axial view images of a diamond with different focus depths; (ii) in a processor, combining the plural axial views to form one or more single optical images; (iii) in a pre-trained neural network, providing a regressive value associated with the clarity grade of the diamond based on the one or more single images acquired during step (i); and (iv) from an output module, providing a clarity grade to the diamond (i) by correlating the regression value from (ii) to a clarity grade.

23 Claims, 15 Drawing Sheets

(51) Int. Cl.
*G06T 7/90* (2017.01)
*G06T 7/00* (2017.01)

(52) U.S. Cl.
CPC .............. *G01N 2201/062* (2013.01); *G06T 2207/20081* (2013.01); *G06T 2207/20084* (2013.01)

(58) Field of Classification Search
CPC ......... G06T 2207/20084; G06T 7/0004; G06T 5/006; G06T 5/009; G06T 2207/20208; G06T 2207/30108; G06N 3/0454; G06N 3/08
USPC ........................................................ 382/109
See application file for complete search history.

(56) References Cited

U.S. PATENT DOCUMENTS

| | | | |
|---|---|---|---|
| 10,739,271 B2 * | 8/2020 | Holloway | G01N 21/87 |
| 11,037,282 B2 * | 6/2021 | Tong | G06T 7/13 |
| 2009/0182520 A1 | 7/2009 | Luxembourg et al. | |
| 2010/0086179 A1 | 4/2010 | Verboven et al. | |
| 2010/0141929 A1 | 6/2010 | Liu | |
| 2017/0046372 A1 | 2/2017 | Verboven et al. | |
| 2018/0204318 A1 | 7/2018 | Verboven et al. | |

FOREIGN PATENT DOCUMENTS

| | | |
|---|---|---|
| CN | 105701709 A | 6/2016 |
| CN | 107909103 A | 4/2018 |
| CN | 108009564 A | 5/2018 |
| CN | 109685038 A | 4/2019 |
| CN | 109991230 A | 7/2019 |
| WO | 2019129238 A1 | 7/2019 |

OTHER PUBLICATIONS

Wang, Jianliang, Authorized Officer, National Intellectual Property Administration, PRC (ISA/CN), "Written Opinion of the International Searching Authority" in connection with related International Application No. PCT/CN2020/105431, dated Nov. 2, 2020, 5 pgs.

Prasse, Torsten, Examiner, European Patent Office, "Extended European Search Report" in connection with related European Patent App. No. 20188445.9, dated Jan. 14, 2021, 8 pgs.

Ren, Zhiguo et al., "Diamond Color Grading Based on Machine Vision", 2009 IEEE 12th International Conference on Computer Vision Workshops, ICCV Workshops, (c) 2009, 7 pgs.

* cited by examiner

500

PROCESS AND SYSTEM FOR DIAMOND CLARITY MEASUREMENT

TECHNICAL FIELD

The present invention relates to a system and a process for ascertaining the clarity of a gemstone. More particularly, the present invention provides a system and a process for ascertaining the clarity of a diamond.

BACKGROUND OF THE INVENTION

As is known, diamonds are a key component utilized in many luxury goods, in particular in articles of jewellery, and can have a very great value.

The value of a diamond depends on several physical properties of the diamond, and there are four globally accepted standards utilized to assess the quality of a diamond, typically known as the 4C's, which are Clarity, Colour, Cut and Carat Weight.

By way of example, the Gemological Institute of America (GIA) has a clarity grade as shown below:

| GIA CLARITY SCALE | | | | | | | | | | |
|---|---|---|---|---|---|---|---|---|---|---|
| FLAWLESS | INTERNALLY FLAWLESS | $VVS_1$ | $VVS_2$ | $VS_1$ | $VS_2$ | $SI_1$ | $SI_2$ | $I_1$ | $I_2$ | $I_3$ |
| | | VERY VERY SLIGHTLY INCLUDED | | VERY SLIGHTLY INCLUDED | | SLIGHTLY INCLUDED | | INCLUDED | | |

For the assessment on the clarity of a diamond, the quantity, size, and position of the defects within the stone are required to be determined.

From the formation conditions under the earth of a diamond to the human applied processes performed on the diamond, different defects can be formed within or on a diamond.

Inside the diamond body, there can be impurities, voids and cracks, which are considered to be internal defects. On the diamond surface, there can be under-polished irregularities and scratches, which are considered external defects.

These internal and external characteristics are also important with respect to a diamond, as they can be one of the unique identifying marks or "birthmarks" that can be used for identifying a particular diamond.

Currently, the most accepted practices to determine a diamond's clarity is by a trained person and by way of visual inspection under 10× magnification.

Gemologists are trained for several months by standard samples with different type of defects, with a view that a stone when assessed by different people should reproduce the same assessment result.

However, even under standardized training and assessment procedures, the repeatability cannot be guaranteed including at least the unavoidable issue subjective human judgement.

Further, assessment of the same diamond by the same person at a different time may also result different clarity grades being applied to the same diamond by that same person. This may also be attributed to human's vision tiredness, different judgement on the same diamond may also be made before and after assessments on many different stones.

Therefore, even for trained and experienced professional gemologists, such gemologists still experience difficultly for providing repeatability in clarity assessment of diamonds.

OBJECT OF THE INVENTION

It is an object of the present invention to provide a system and a process for ascertaining clarity of a gemstone, in particular a diamond, which overcomes or at least partly ameliorates at least some deficiencies as associated with the prior art.

SUMMARY OF THE INVENTION

In a first aspect, the present invention provides a process operable using a computerized system for grading the clarity of a diamond, the computerized system including an optical image acquisition device, a processor, a pre-trained neural network and an output module operably interconnected together, said process including the steps of:

(i) acquiring via an optical image acquisition device one or more plurality of axial view images of a diamond with different focus depths, wherein the focal depths are determined by the height of the diamond and the plurality of axial view images are acquired in an environment having a predetermined constant light level, and wherein the axial view is defined as a view towards the diamond in a direction of a central axis normal to the table of the diamond and passing through the apex of the pavilion of the diamond, and the height of the diamond is defined as the length of the central axis of the diamond, (ii) in a processor, combining the plurality of axial views to form one or more single optical images, wherein the single image comprises in-focus defects from the plurality of axial views and such that out of in-focus defects from the plurality of axial within the diamond are rejected;

(iii) in a pre-trained neural network, providing a regressive value associated with the clarity grade of said diamond based on the one or more single images acquired during step (i); wherein the pre-trained neural network has been pre-trained utilising one or more single optical images acquired from a plurality of diamonds each having a pre-assigned clarity grade assigned thereto and wherein the one or more single optical images acquired from a plurality of diamonds are provided by the same process of step (i), and acquired in an environment having a predetermined constant light level the same as that as (i); and (iv) from an output module, providing a clarity grade to the diamond of (i) by correlating the regression value from (ii) to a clarity grade.

The height of the diamond may be determined by an optical image acquired via a further optical image acquisition device located normal to the central axis of the diamond.

Different focus depths corrected with the refractive index of the diamond.

The apparent focus depth $D_{apparent}$ for focusing may be corrected according to the formula:

$$D_{apparent} = \frac{D_{real}}{n_{diamond}}$$

wherein $n_{diamond} \approx 2.42$

The predetermined constant light level is preferably a colour temperature of 6500K.

The plurality of axial view images of a diamond may be acquired within a system of integrating spheres.

The light source providing said predetermined light level may be selected from the group including an LED (Light Emitting Diode) light source, a Xeon lamp light source, and incandescent light source, and fluorescent lamp light source, a solar simulator or the like.

The optical image acquisition device may be a digital camera. The optical image acquisition device is a monochromatic or polychromatic device.

A plurality of axial view images of the diamond may be acquired about said central axis.

A plurality of axial view images of said plurality of diamonds are acquired about said central axis.

The one or more plurality of axial view images of the diamond may be acquired utilising High Dynamic Range (HDR) techniques.

The one or more plurality of axial view images of said plurality of diamonds may be acquired utilising High Dynamic Range (HDR) techniques.

Flat field correction may be utilized in the acquisition of the one or more plurality of axial view images of the diamond.

Flat field correction may be utilized in the acquisition of the one or more plurality of axial view images of said plurality of diamonds.

The axial view may a view in the direction towards the table of the diamond.

The axial view may a view in the direction towards the pavilion of the diamond.

In a second aspect, the present invention provides a computerized system for grading the clarity of a diamond as a function of internal defects within the body of the diamond, the computerized system including an optical image acquisition device, a processor, a pre-trained neural network and an output module operably interconnected together, said process including the steps of:

(i) optical image acquisition device for acquiring one or more plurality of axial view images of a diamond with different focus depths, wherein the focal depths are determined by the height of the diamond and the plurality of axial view images are acquired in an environment having a predetermined constant light level, and wherein the axial view is defined as a view towards the diamond in a direction of a central axis normal to the table of the diamond and passing through the apex of the pavilion of the diamond, and the height of the diamond is defined as the length of the central axis of the diamond, (ii) a processor in communication with the image acquisition device, for combining the plurality of axial views to form one or more single optical images, wherein the single image comprises in-focus defects from the plurality of axial views and such that out of in-focus defects from the plurality of axial within the diamond are rejected;

(iii) a pre-trained neural network in communication with the processor and providing a regressive value associated with the clarity grade of said diamond based on the one or more single images acquired of said diamond by the optical image acquisition device, wherein the pre-trained neural network has been pre-trained utilising one or more single optical images acquired from a plurality of diamonds each having a pre-assigned clarity grade assigned thereto and wherein the one or more single optical images acquired from a plurality of diamonds are provided by the same process of step (i), and acquired in an environment having a predetermined constant light level the same as that as (i); and (iv) an output module in communication with the pre-trained neural network and for providing a clarity grade to the diamond of by correlating the regression value from to a clarity grade.

The computerized system may further comprise a light source for providing said predetermined constant light level is a colour temperature of 6500K. The light source may be selected from the group including an LED (Light Emitting Diode) light source, a Xeon lamp light source, and incandescent light source, and fluorescent lamp light source, a solar simulator or the like.

The computerized system may further comprise system of integrating spheres, in which the diamond is located when the at least a first optical image is acquired.

The computerized system may further comprise a rotational platform rotatable about said central axis and within the system of integrating spheres, wherein the rotational platform provides for rotation of the diamond about the central axis such that a plurality of optical images of the diamonds can be acquired by the optical image acquisition device.

The optical image acquisition device may be a digital camera. The optical image acquisition device is monochromatic or polychromatic.

The system may further comprise a further optical acquisition device for acquiring an optical image of a side view of the diamond so as to provide for ascertaining the height of the diamond.

The axial view may a view in the direction towards the table of the diamond. The axial view may a view in the direction towards the pavilion of the diamond.

In a third aspect, the present invention provides a report indicative of the grading the clarity of a diamond, wherein the clarity grading of the diamond has been provided by the process according to the first aspect.

BRIEF DESCRIPTION OF THE DRAWINGS

In order that a more precise understanding of the above-recited invention can be obtained, a more particular description of the invention briefly described above will be rendered by reference to specific embodiments thereof that are illustrated in the appended drawings. The drawings presented herein may not be drawn to scale and any reference to dimensions in the drawings or the following description is specific to the embodiments disclosed.

FIG. 4b shows a photographic representation of an image focused in the middle of a diamond of FIG. 4a;

DETAILED DESCRIPTION OF THE DRAWINGS

Figure 1:
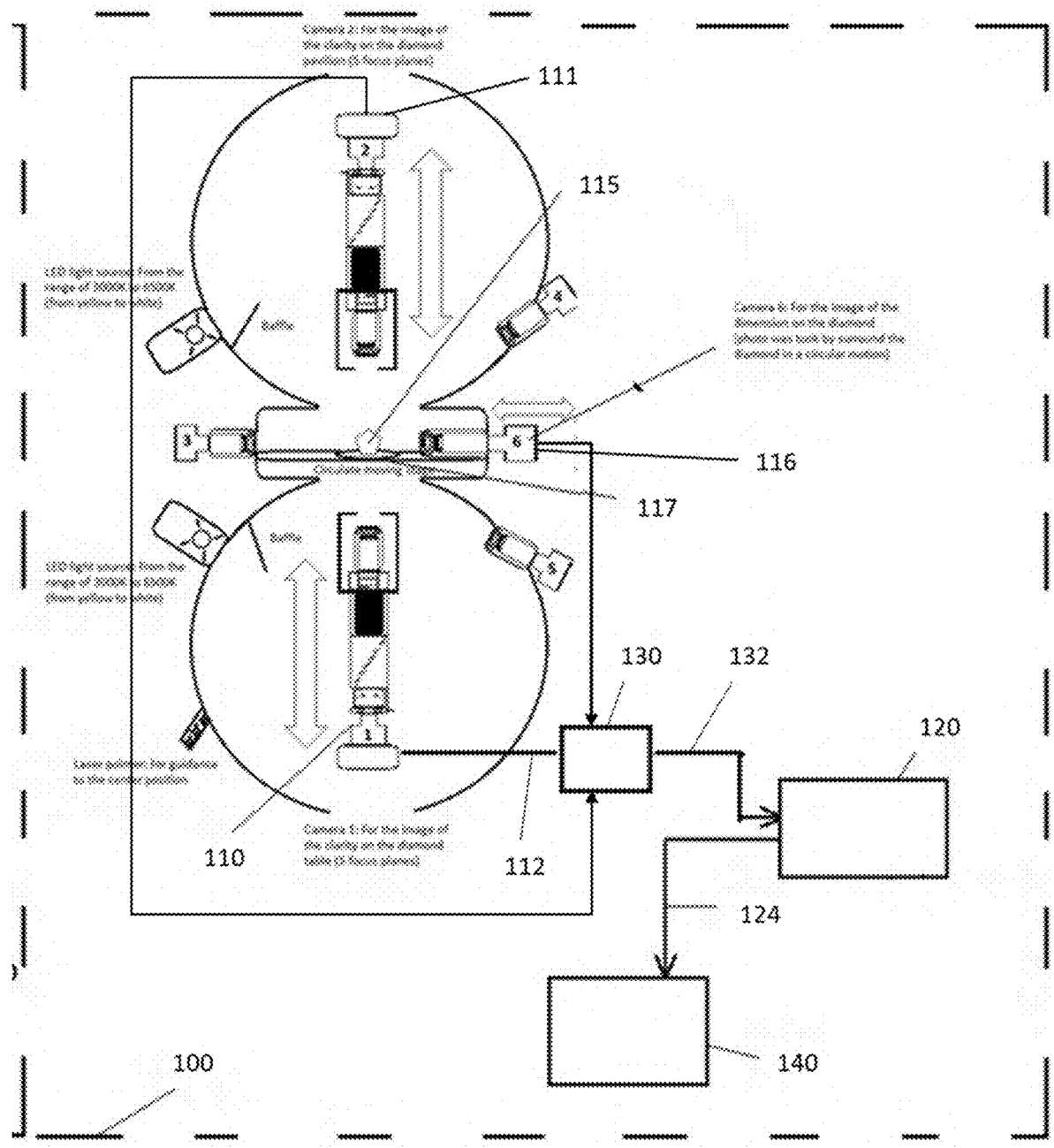
FIG. 1 shows a schematic representation of an embodiment of a system according to the present invention.

The present inventors have identified shortcomings in the manner in which clarity grading of diamonds is performed, and upon identification of the problems with the prior art, have provided a system and process which overcomes the problems of the prior art, and provides a system and process which is more consistent and reliable.

1. Present Invention

Embodiments of the present invention are as follows:

1.1 Pre-Processing

In embodiments of the present invention, the pre-processing of trained neural network clarity grading process involves several steps. The pre-processing applies to photos with different focal depth with respect to the diamond. The preprocessing steps include:

(i) HDR (High Dynamic Range)

The inclusions, otherwise known as defects or inhomogeneities, of a gemstone have different size and color. Therefore, different inclusions have different visibility under camera view.

Some smaller inclusions need stronger light illumination or longer camera exposure time to be captured. However, if a very long exposure time is set for low visibility inclusions, some facets and high visibility inclusions of the gemstone may be over exposed.

Therefore, a series of images are preferably taken with different exposure time or light intensity. The captured image series contains both high and low visibility inclusions. The image series are then combined for form a single image. This method is the high dynamic range (HDR) method.

(ii) Focus Combining

The inclusions of a gemstone are distributed in a 3-dimensional volume. Therefore, the series of images taken at different focal depth is needed to capture all inclusions for the whole gemstone.

To have an image of gemstone having all the inclusions of the gemstone, the series of images with different focus are combined.

For the combination process, the in-focus information is retained while the out of focus information is rejected, forming an image with all inclusions at in focus conditions.

(iii) Flat-Field Correction

Flat-field correction is a technique to correct image artifacts caused by variation of pixel sensitivity.

The variation of sensitivity usually caused by 2 factors. The first is the pixel performance in electronic level. Since it is impossible to perfectly engineer every pixel on the camera detector to be exactly the same, there exist pixel to pixel variation in sensitivity on ever camera detector. The second usual cause to the variation is the optical design.

The combination of lens in a camera can cause brightness variation of the image. The most common case is dimmer perimeter of an image.

The variation in pixel sensitivity can be corrected by taking a plurality of flat-field image F with an empty and clean background under the working lighting conditions.

A dark field image D can also be taken with the camera covered to block all light.

The dark field image can sometime be omitted because it normally has low pixel values, especially for high quality camera.

The flat-field correction can then be done with the raw image R to produce a corrected image C with a factor m, which is the image averaged value of (F–D) or a targeted value.

$$C=((R-D)*m)/((F-D))$$

(iv) Background Removal

Background removal may also be performed in order to provide improved learning by the neural network and enhanced determination of clarity grade.

(v) Resize and Cropping

Images of the diamonds are cropped from the background at the peripheries.

Different diamonds may have different sizes. Images of which are therefore resized to achieve a constant size and resolution with each other.

Resizing and cropping is preferable, and may not necessarily be embodied in every aspect of the invention (vi) Rotation for Data Augmentation Multiple images may be acquired about the axis of the diamond, for improved learning by the neural network and enhanced determination of clarity grade.

1.2 Neural Network Processing (i) Regression

The pre-processed images are input into convolutional neural network (CNN) for clarity training and prediction.

As the clarity of a gemstone is affected by the inclusion type and position, clarity grade of a gemstone is a discrete classification problem. However, since clarity is also affected by inclusion size, color and quantity, clarity of gemstone also have certain continuous properties.

Therefore, artificial intelligence (AI) clarity grading using a neural network is not as simple as classical classification problem.

For example, there are stones with clarity VS1 but quite close to the next clarity grade VVS2 as the stones have inclusion size marginal to VVS2. In the case of artificial intelligence (AI) clarity grading, an image is input into the CNN to capture the abstract characteristics from the clarity image.

The characteristics are analyzed by a regression method to accommodate and take care of the continual properties of clarity. The output of the regression is a continual value, instead of discrete grade.

(ii) Rotation Method

Since the inclusion distribution in a 3D volume of a gemstone, it may appear different on different rotation angle as the viewing perspective is different.

Hence, the AI clarity evaluation using a neural network, of a gemstone, can give different results at different rotation angle.

In traditional AI classification problem, a voting method is used in general for determination of the most suitable or possible result.

However, in the case of gemstone, gemologist grades the clarity of a gemstone as determined by the present inventors, by general consideration, instead of voting for the clarity at different angles.

Therefore, in order to mimic or emulate the real situation of clarity grading, averaging of clarity results from different angles can be used.

In preferred embodiments, multiple photographic representations are acquired about the axis of the diamond, for example 40 different images at 9 degrees apart, as clarity can appear different due to the viewability of inclusions at particular viewing angles.

Such multi-views can be used for both assessment of the clarity of a diamond, as well as for the training of the neural network with diamonds of pre-determined clarity grading.

1.3 Data Interpretation

Clarity Domain

Combining the regression and average or other similar statistical analysis methods, the regression values from different angles are combined by averaging to give a final regression value.

The regression value means a gemstone's position between different clarity grades.

For example, 1.0 represents clarity grade VVS2 and 2.0 represent clarity grade VS1. A gemstone with regression value 1.3 means that it has a clarity grade VVS2 because it is closer to 1.0 such as is shown below:

|  | Regression Value | | | | | |
| --- | --- | --- | --- | --- | --- | --- |
|  | <0.5 | [0.5, 1.5) | [1.5, 2.5) | [2.5, 3.5) | [3.5, 4.5) | [4.5, 5.5) |
| Clarity Grade | VVS1 | VVS2 | VS1 | VS2 | SI1 | SI2 |

This regression value also means that the gemstone has a clarity near to clarity VS1 but not near clarity VVS1.

For this, a new concept of "clarity domain" is introduced in addition to existing clarity systems such as the GIA clarity grading system.

A gemstone with regression values between 2 consecutive integers is considered to be the same clarity domain.

2. Examples and Embodiments of the Invention

Referring to FIG. 1, there is shown a schematic representation of a system 100 in accordance with the present invention. The system 100 includes an optical image acquisition device 110 in communication 112 with a processor 130 which is in communication 132 with a neural network 120. An output device 340 is provided, which is in communication 125 with the neural network 120.

The system 100 includes a system integrating spheres 150, in which the diamond 315 is located when the plurality of optical images are acquired.

The optical image acquisition device 110 is a digital camera device or other device such as a CCD camera or the like, which allows for acquisition of an optical image of a diamond 115 which is located so as to be able to acquire images of the diamond from above the diamond 115 in a direction of towards the table of the diamond. In this example, the diamond 115 is arranged with the table down. The diamond is supported by an optically transparent platform 117, which may be formed for example by a thin layer of quartz, to allow images to be acquired therethrough.

The system 100 may include another optical image acquisition device 111 for viewing the diamond in a direction of towards the pavilion of the diamond 115.

Thus and in accordance with the present invention, axial views of the diamond 115 may be acquired at different focal distances.

An axial view is defined as a view towards the diamond 115 in a direction of a central axis normal to the table of the diamond 115 and passing through the apex of the pavilion of the diamond.

The height of the diamond is defined as the length of a central axis normal to the table of the diamond 115 and passing through the apex of the pavilion of the diamond.

In accordance with the present invention the axial view of the diamond 115 may be a view in the direction towards the table of the diamond 115. Such a view is a top view of the diamond from above the diamond 115, and looking directly onto the table of the diamond 115.

Alternatively, the axial view of the diamond 115 may be a view in the direction towards pavilion of the diamond 115. Such a view is a bottom view of the diamond 115 from below the diamond 115, and looking directly onto the pavilion of the diamond 115.

As will be understood, a single optical image acquisition device could alternatively be utilised, in conjunction with an appropriate holder, to invert the diamond to allow for both table and pavilion views of the diamond 115.

A further optical image acquisition device 116 is provided for acquiring side views of the diamond 115 which can be used to determine the height of the diamond 115, and which is in communication with the processor 130

The system 100 includes a light source 118 for providing said predetermined constant light level is a colour temperature of 6500K. The light source is selected from the group including an LED (Light Emitting Diode) light source, a Xeon lamp light source, and incandescent light source, and fluorescent lamp light source, a solar simulator or the like.

The platform 117 may be rotatable about said central axis of the diamond 115 and within the system of integrating spheres 150, wherein the rotational platform 117 provides for rotation of the diamond about the central axis such that a plurality of optical images of the diamonds can be acquired by the optical image acquisition device 110.

The system 100 may be provided as a single unit and with the integers of the system 100 being provided as an integral device.

Alternatively, the integers of the system 100 can be provided separately, and the neural network 120 being provided either in an adjacent location to, for example, a touch sensitive input device and visual display unit 140 or provided at a remote location and in communication with the touch sensitive input device and visual display unit 140 by way of a telecommunications network.

Figure 2A:
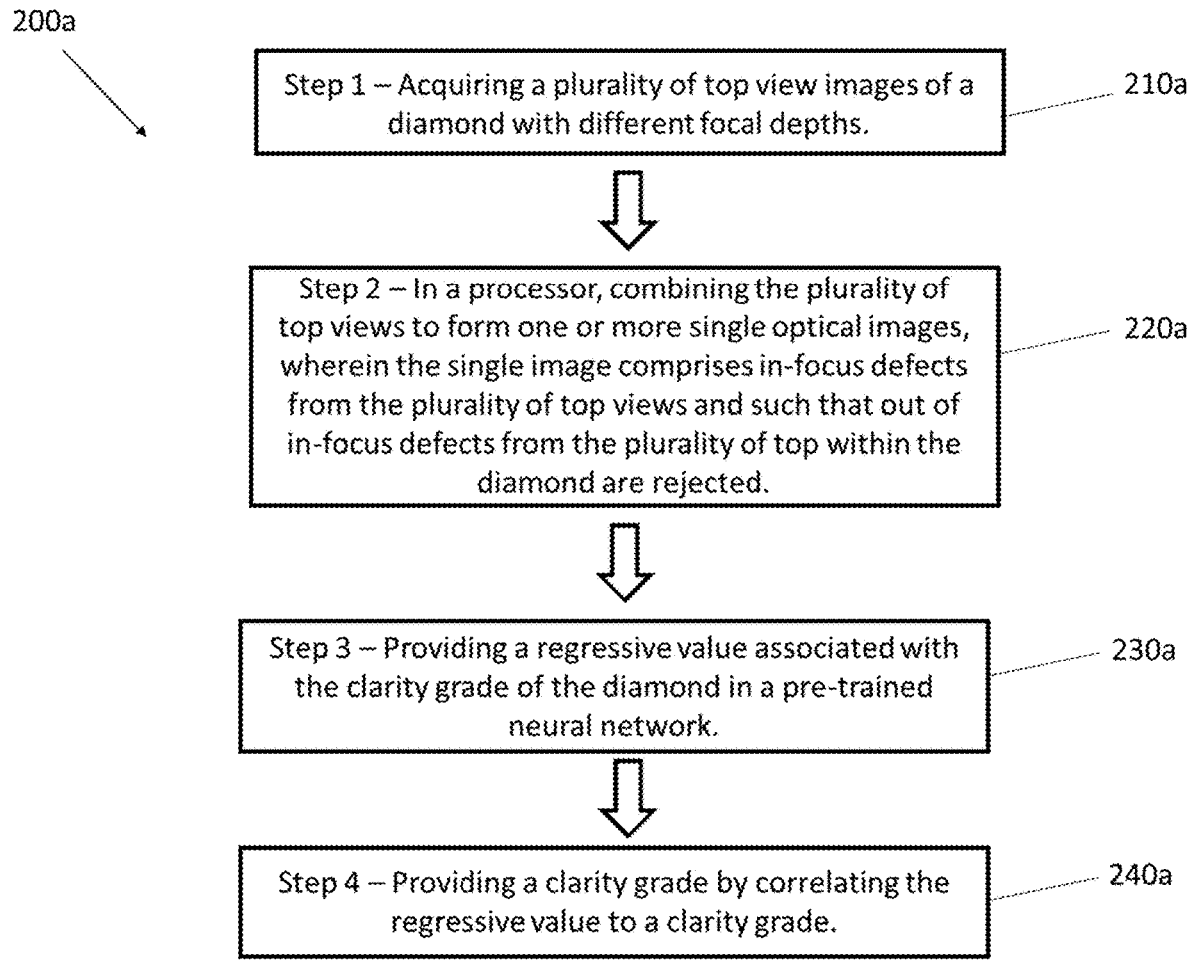
FIG. 2a shows a flow chart of a process according to the present invention.
Figure 2B:
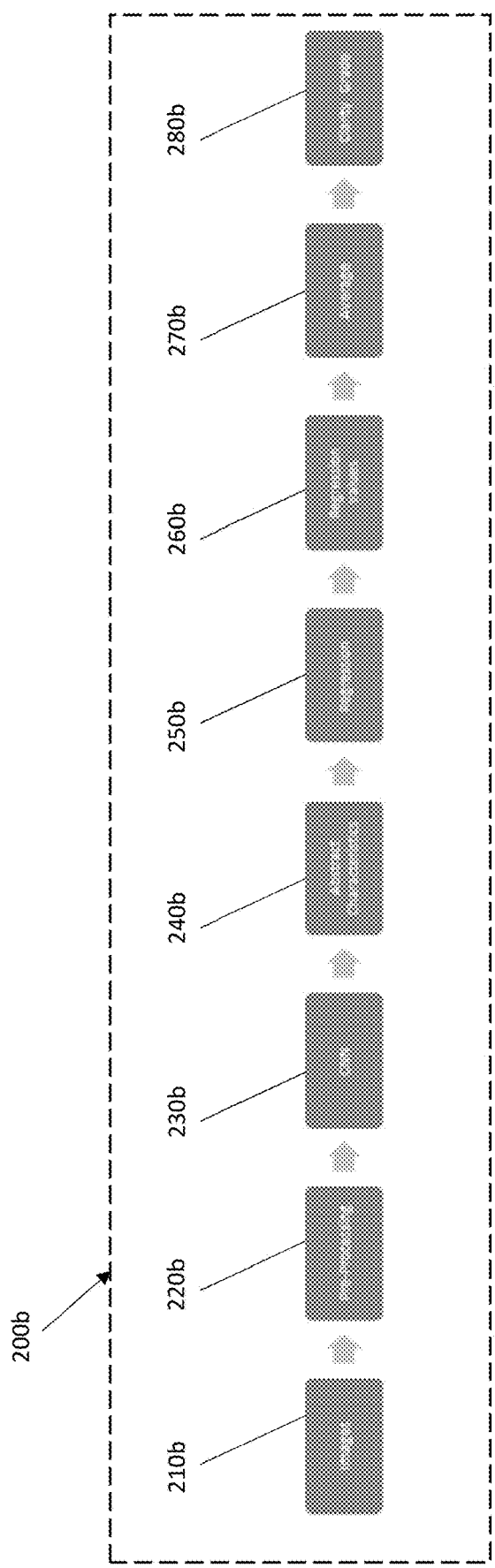
FIG. 2b shows a representation of a flow chart of an embodiment of the process according to the present invention.
Figure 3:
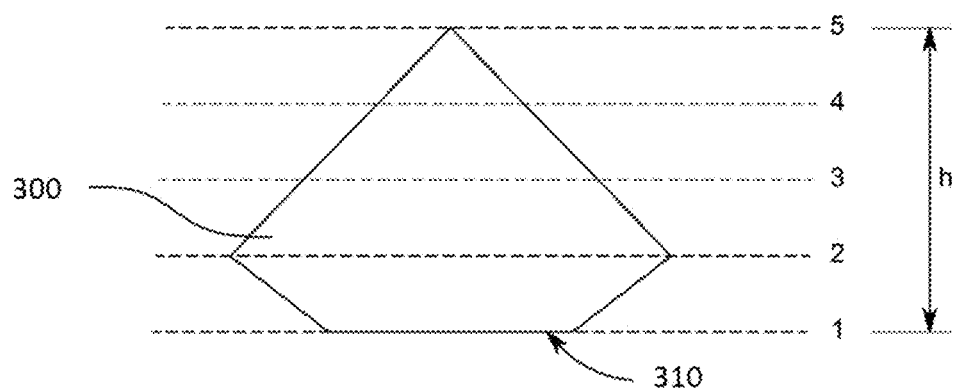
FIG. 3 diagrammatically depicts an embodiment of the process according to the present invention.

Referring now to FIG. 2a in which a flow chart of the process 200a of the invention is shown, and FIG. 2b in which a flow chart of an embodiment of the process 200b of the present invention is shown, and to FIG. 3, which depict diagrammatically the process of the present invention, which can be implemented within the system of FIG. 1.

The process 200a of the present invention is operable using a computerized system 100 of FIG. 1 for grading the clarity of a diamond as a function of internal defects within the body of the diamond, whereby the computerized system including an optical image acquisition device, a processor module, a neural network and an output module operably interconnected together.

The process 200a includes the steps of:

First Step 210a—Acquiring via an optical image acquisition device such as optical image acquisition device 110 of FIG. 1 one or more plurality of axial view images of a diamond with different focus depths, wherein the focal depths are determined by the height of the diamond and the plurality of axial view images are acquired in an environment having a predetermined constant light level, and wherein the axial view is defined as a view normal to the table of the diamond and the height of the diamond is defined as the length of a central axis normal to the table of the diamond and passing through the apex of the pavilion of the diamond.

The axial view is defined as a view towards the diamond in a direction of a central axis normal to the table of the diamond and passing through the apex of the pavilion of the diamond, and the height of the diamond is defined as the length of a central axis normal to the table of the diamond and passing through the apex of the pavilion of the diamond.

In accordance with the present invention the axial view of the diamond may be a view in the direction towards the table of the diamond. Alternatively, the axial view of the diamond may be a view in the direction towards pavilion of the diamond.

Second Step 220a—In a processor module such as processor module 130 of FIG. 1, combining the plurality of axial views to form one or more single optical images, wherein the single image comprises in-focus defects from the plurality of axial views and such that out of in-focus defects from the plurality of axial within the diamond are rejected.

Third Step 230a—in a pre-trained neural network such as pre-trained neural network 120 of FIG. 1, providing a regressive value associated with the clarity grade of said diamond based on the one or more single images acquired during step (i); wherein the pre-trained neural network has been pre-trained utilising one or more single optical images acquired from a plurality of diamonds each having a pre-assigned clarity grade assigned thereto and wherein the one or more single optical images acquired from a plurality of diamonds are provided by the same process of step (i), and acquired in an environment having a predetermined constant light level the same as that as (i).

Fourth Step 240a—from an output module such as output module 140 of FIG. 1, providing a clarity grade to the diamond of (i) by correlating the regression value from (ii) to a clarity grade.

The height of the diamond may be determined by an optical image acquired via a further optical image acquisition device located normal to the central axis of the diamond such as optical image acquisition device 116 of FIG. 1

The apparent focus depth $D_{apparent}$ for focusing is corrected according to the formula:

$$D_{apparent} = \frac{D_{real}}{n_{diamond}}$$

wherein $n_{diamond} \approx 2.42$

With the stone height inferred from the sideview image, a plurality of images of different focus depths of the diamond can be captured perpendicularly to the table for the detection of defects. This may be done by dividing the height of the diamond into corresponding focus depths.

However, since the sideview image is captured in air, while the images perpendicular to the table are to be captured in the diamond, the refractive indices difference in air ($n_{air} \approx 1$) and diamond ($n_{diamond} \approx 2.42$) will affect the focus depths determination. Taking an approximation of the light ray's angle of incidence is small with respect to images captured perpendicularly to the table, the apparent depth $D_{apparent}$ for focusing can be corrected as:

$$D_{apparent} = \frac{D_{real}}{n_{diamond}}$$

instead of the real depth Dreal.

The predetermined constant light level is a range of colour temperature of 6500K.

The plurality of axial view images of a diamond is acquired within a system of integrating spheres, and the light source providing said predetermined light level is selected from the group including an LED (Light Emitting Diode) light source, a Xeon lamp light source, and incandescent light source, and fluorescent lamp light source, a solar simulator or the like.

Referring now to FIG. 2b, in the embodiment as shown, the following steps of process 200b are utilised:

Step (i) 210b—Capture a plurality of axial view images of a diamond with different focal depths;

Step (ii) 220b—Conduct pre-processing to the optical images, and combining the plurality images with different focal depths to form one or more single optical images in-focus;

Step (iii) 230b—Input the pre-processed images into a pre-trained neural network, pretrained in the same manner and conditions in present example using diamonds of pre-determined clarity grade;

Step (iv) 240b—Identify the abstract characteristics of the diamond;

Step (v) 250b—Analyze the abstract characteristics by regression method;

Step (vi) 260b—Determine the regression values of the one or more optical images of the diamond;

Step (vii) 270b—Determine an average of the regression values of the one or more optical images of the diamond; and Step (viii) 280b—Determine the clarity grade of the diamond.

As such, the present invention present invention provides for the generation of a report which is indicative of the grading the clarity of a diamond, whereby the clarity grading of the diamond has been provided by the process according to the present invention.

Such a report which correlates to a particular diamond, can be used for determining the value of the diamond, and the grading as provided by the report may be utilised commercially in respect of supply, wholesaling and retail sales of the diamond.

As shown in FIG. 3, from a side view of the height of the diamond 300, the plurality of images of the table 310 at different focus depths 1 to 5 is shown, corresponding to the first step of the process. The height h of the diamond can be determined by the side view, which can be acquired by an image acquisition device, such as a digital camera or CCD camera.

Figure 4A:
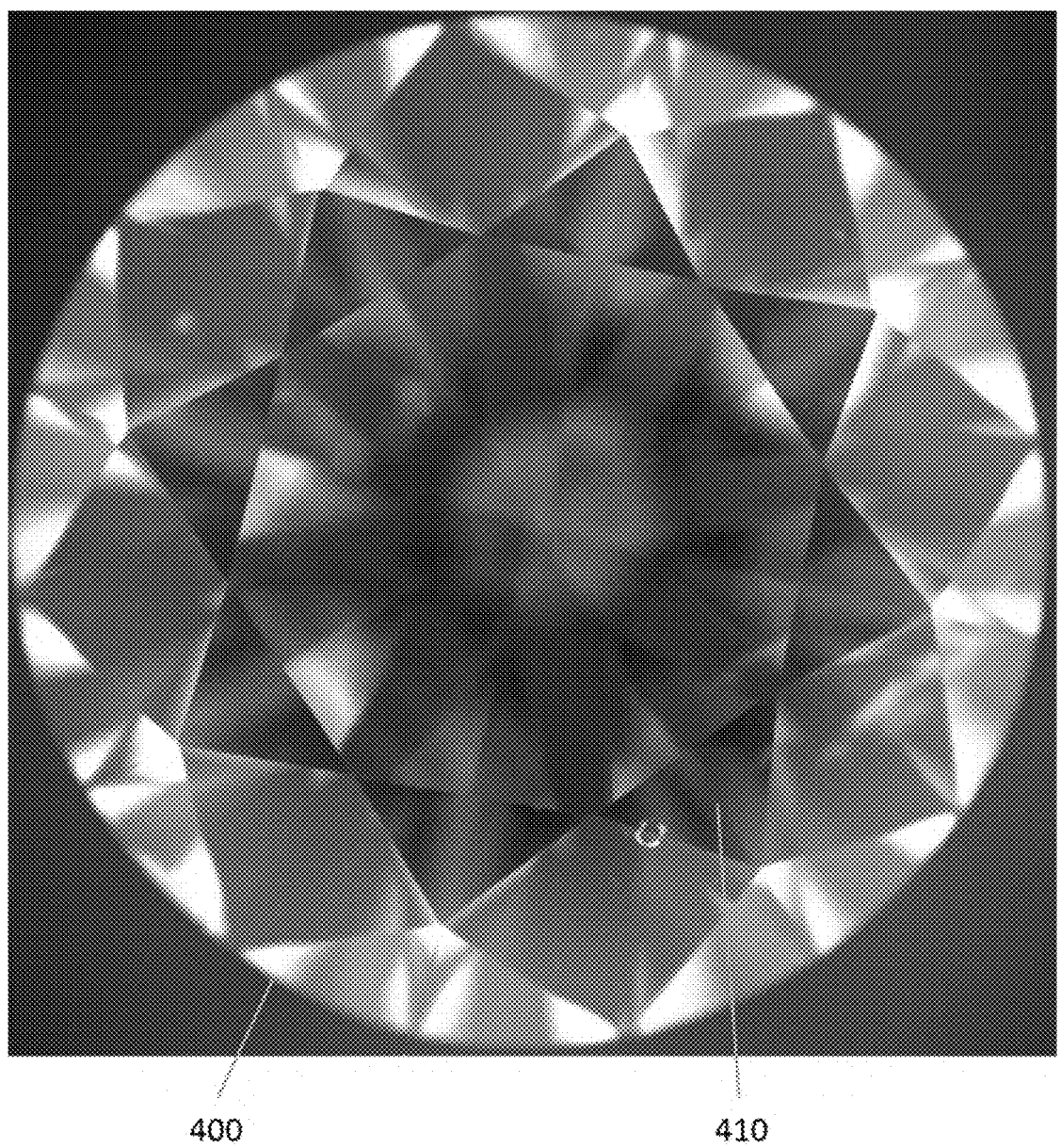
FIG. 4a shows a photographic representation of an image of the table of a diamond in focus.
Figure 4B:
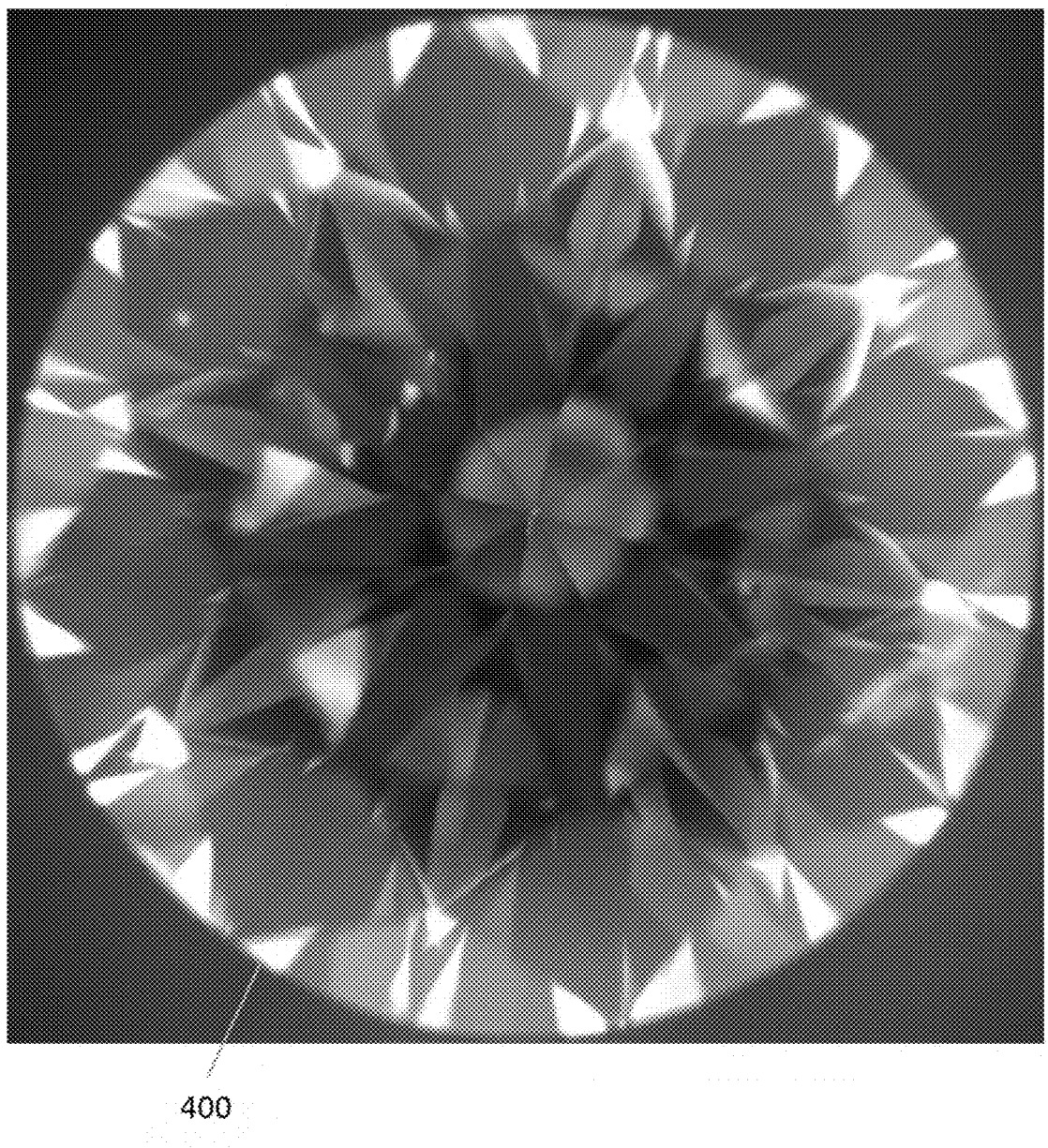
Figure 4C:
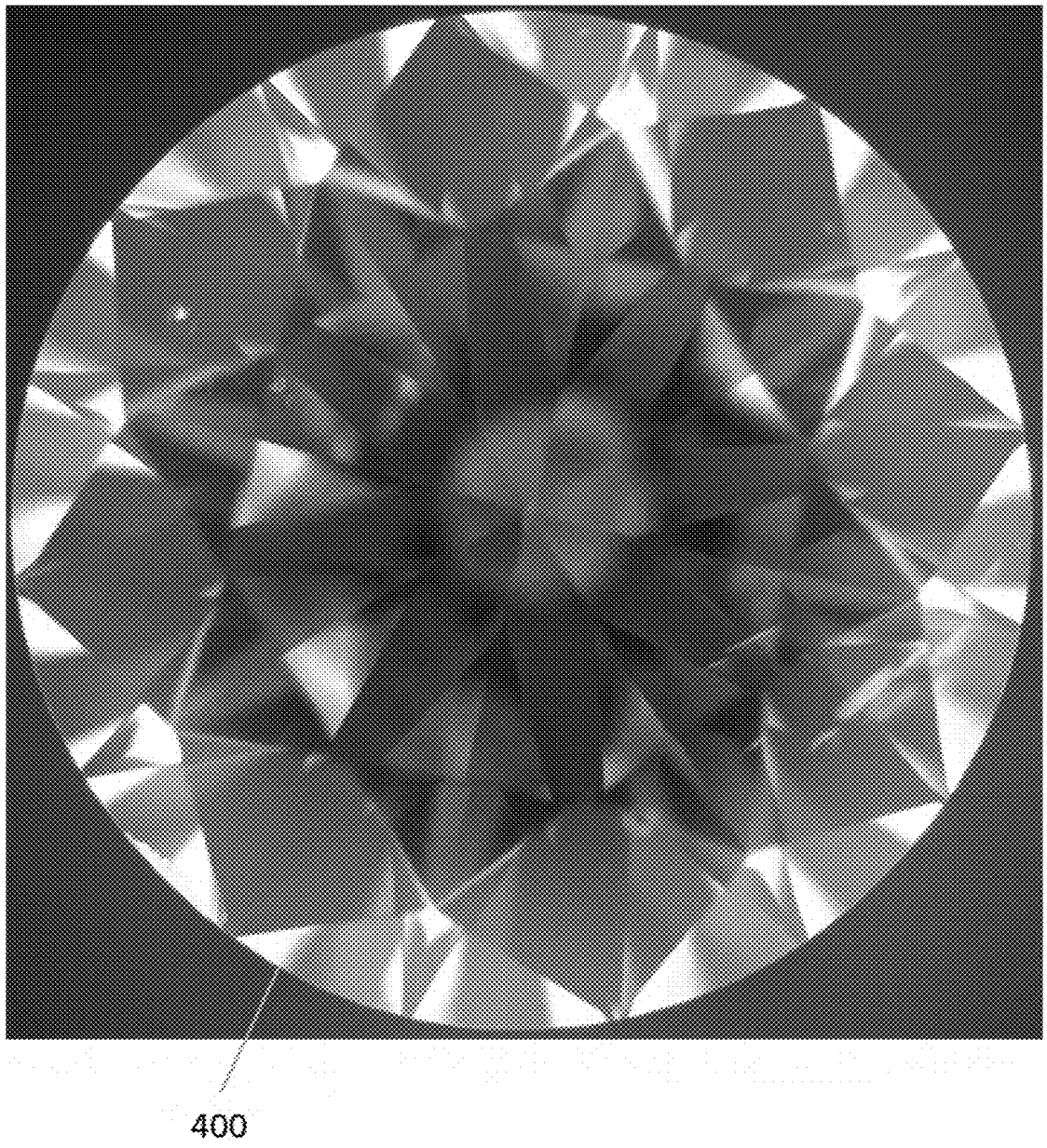
FIG. 4c shows a photographic representation of an image focused deep into the diamond in FIG. 4a and FIG. 4b.

Referring to FIGS. 4a, 4b and 4c, there are shown photographic representations of axial images of a diamond 400 wherein the axial images are in the direction of towards the table of the diamond 400 in focus, focused in the middle, and focused deep into the diamond respectfully.

Figure 4D:
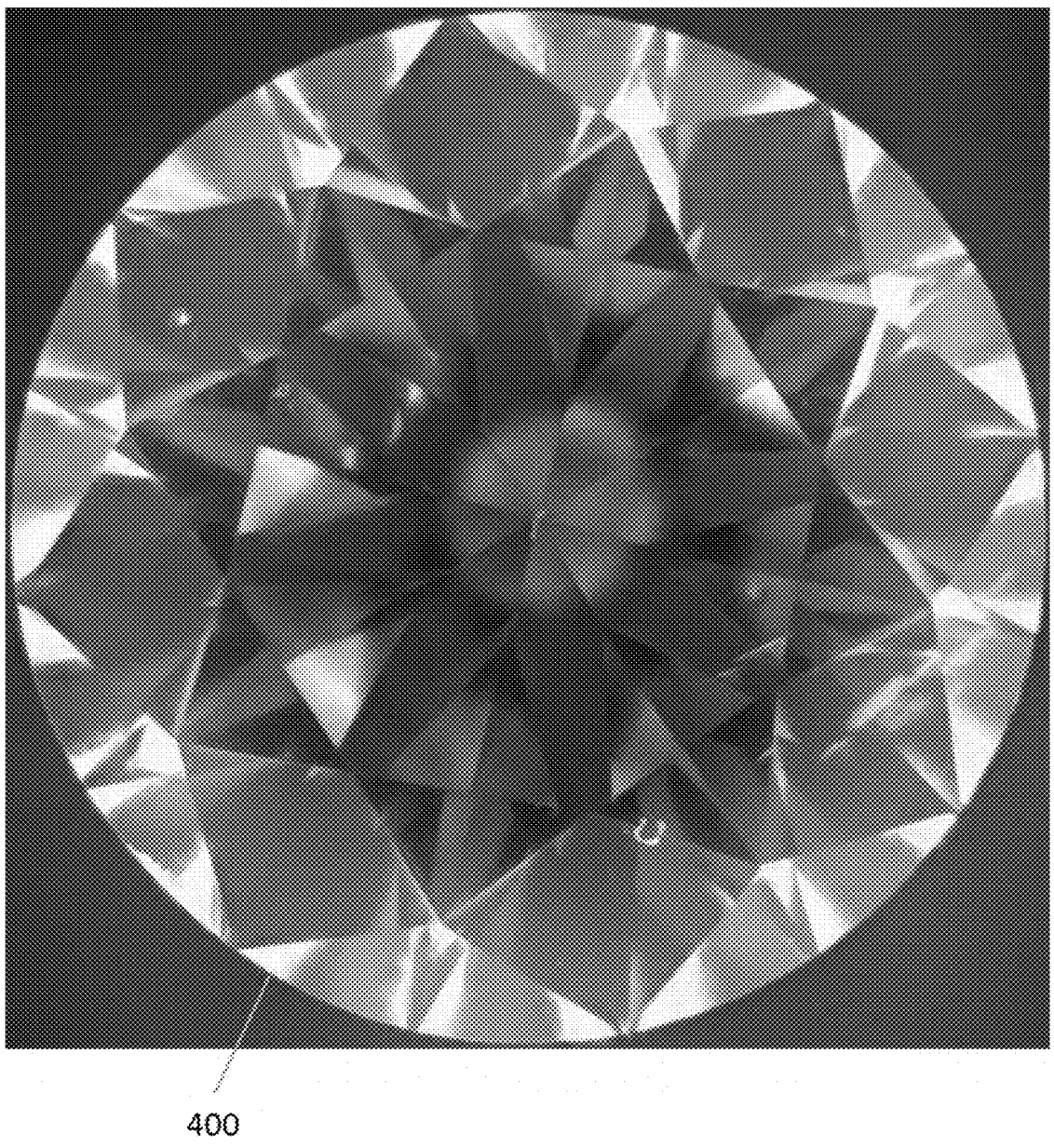
FIG. 4d shows a photographic representation of an image of a combined image preserving all the in focus features at different focus depths as acquired in FIGS. 4a, 4b and FIG. 4c.

FIG. 4a shows a photographic representation of an image of the table 410 of a diamond 400 in focus. FIG. 4b shows a photographic representation of an image focused in the middle of a diamond 400 of FIG. 4a. FIG. 4c shows a photographic representation of an image focused deep into the diamond of FIG. 4a and FIG. 4b, utilising the process as described with reference to FIG. 3;

FIG. 4d shows a photographic representation of an image of a combined image preserving all the in focus features at different focus depths of the diamond 400 as acquired in FIGS. 4a, 4b and 4c.

In accordance with the present invention, both training and grading, when utilising the present technique of image acquisition for clarity grading and in the manner in accordance with the present invention, provides for a process of increased accuracy and consistency over the prior art techniques.

Figure 5A:
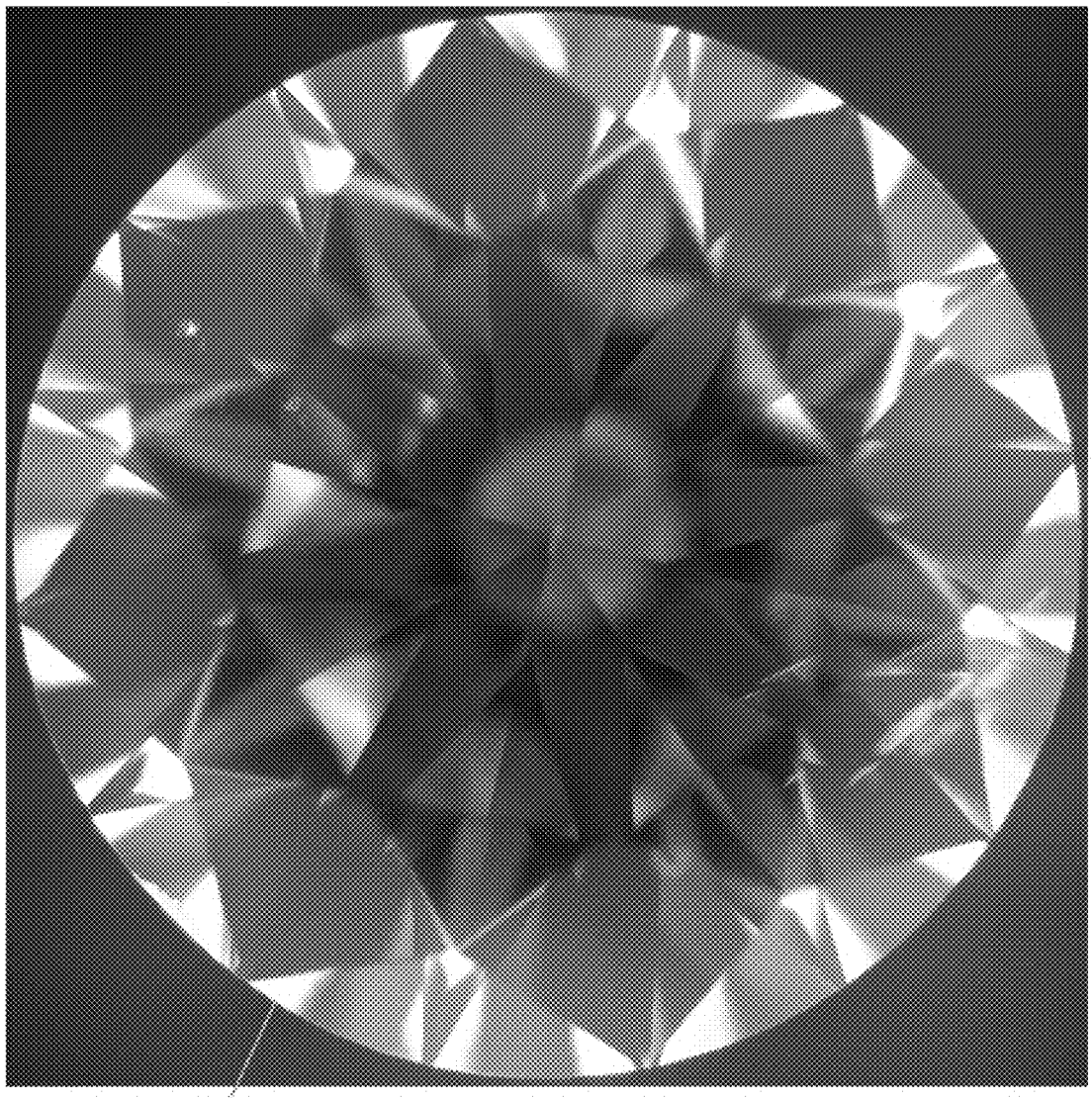
FIG. 5a shows a photographic representation of an image of a diamond with high exposure with over exposed features at the reflecting facets.
Figure 5B:
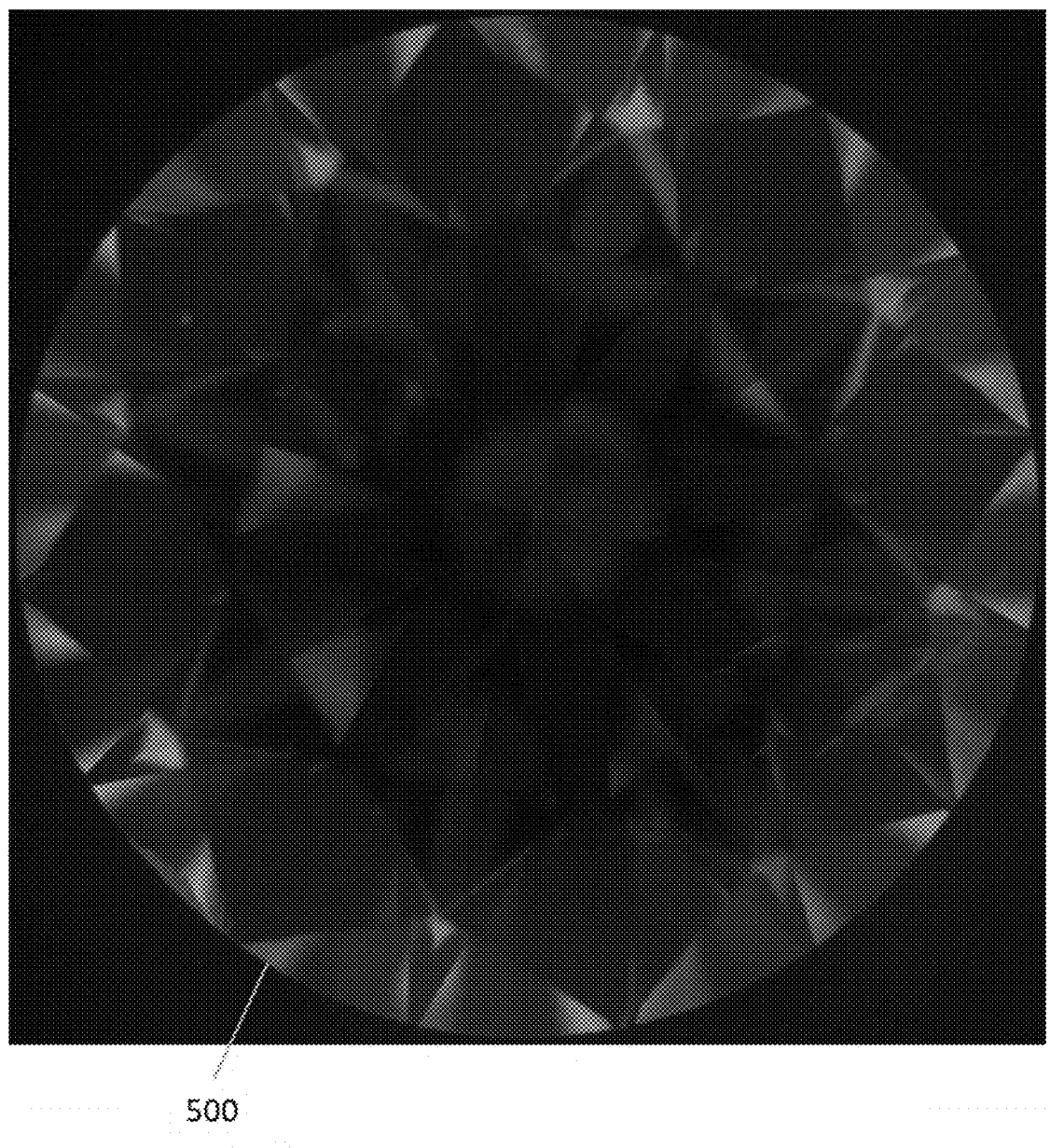
FIG. 5b shows a photographic representation of an image of the diamond of FIG. 5a with low exposure.
Figure 5C:
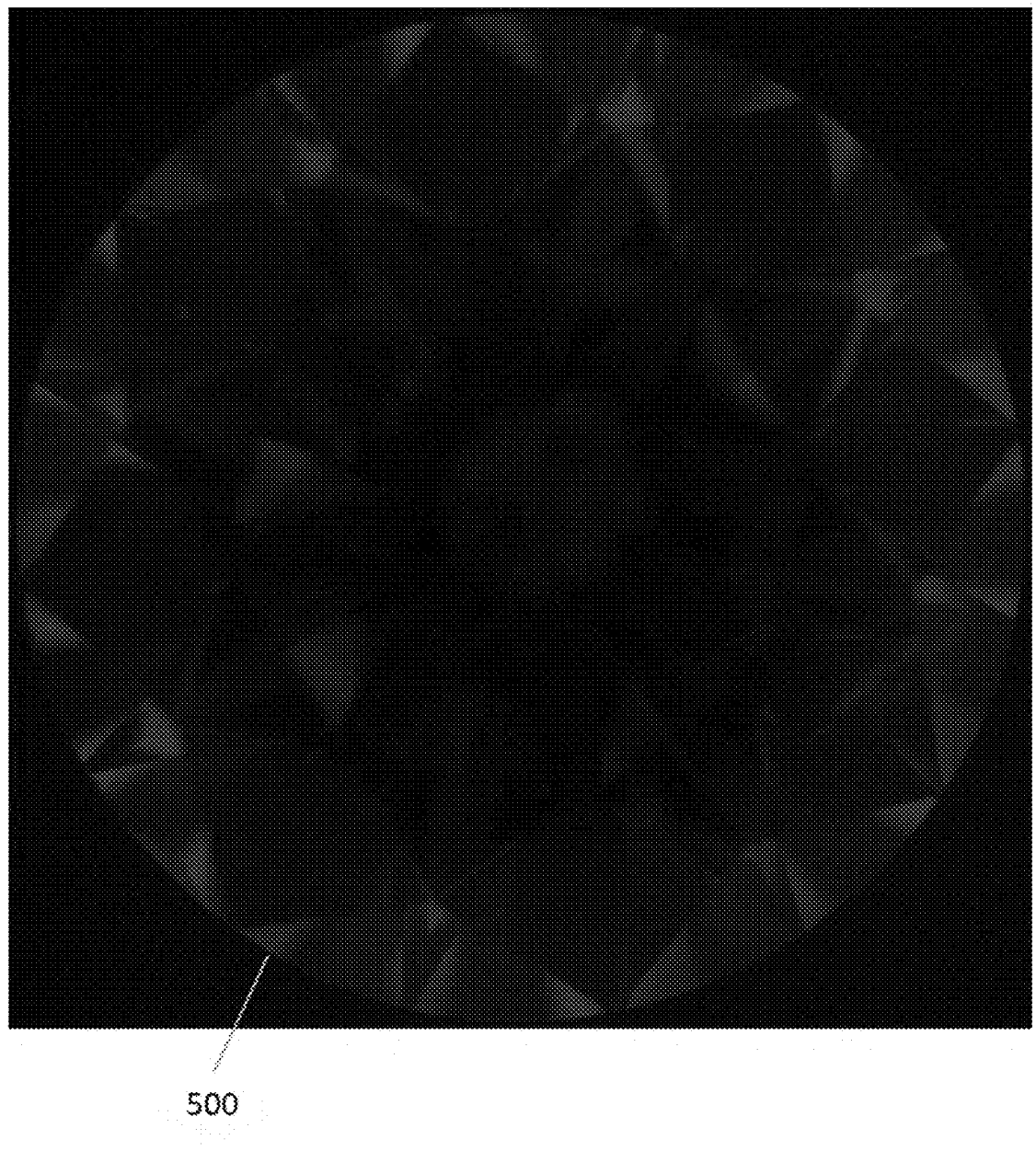
FIG. 5c shows a photographic representation of an image of the diamond of FIG. 5a with very low exposure.
Figure 5D:
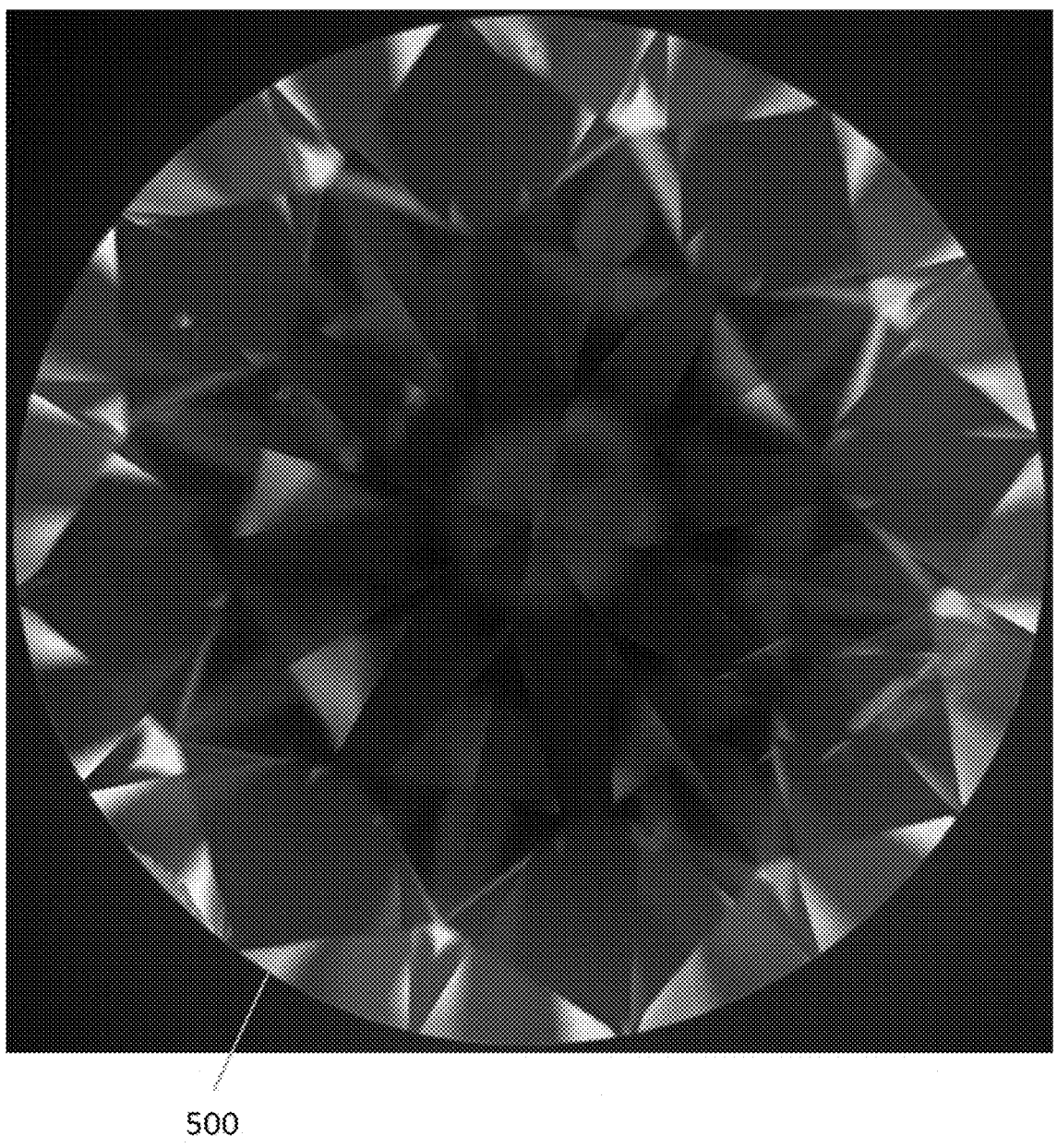
FIG. 5d shows a photographic representation of an image of the diamond of FIG. 5a with focus combined preserve the features at the reflecting facets.
Figure 6A:
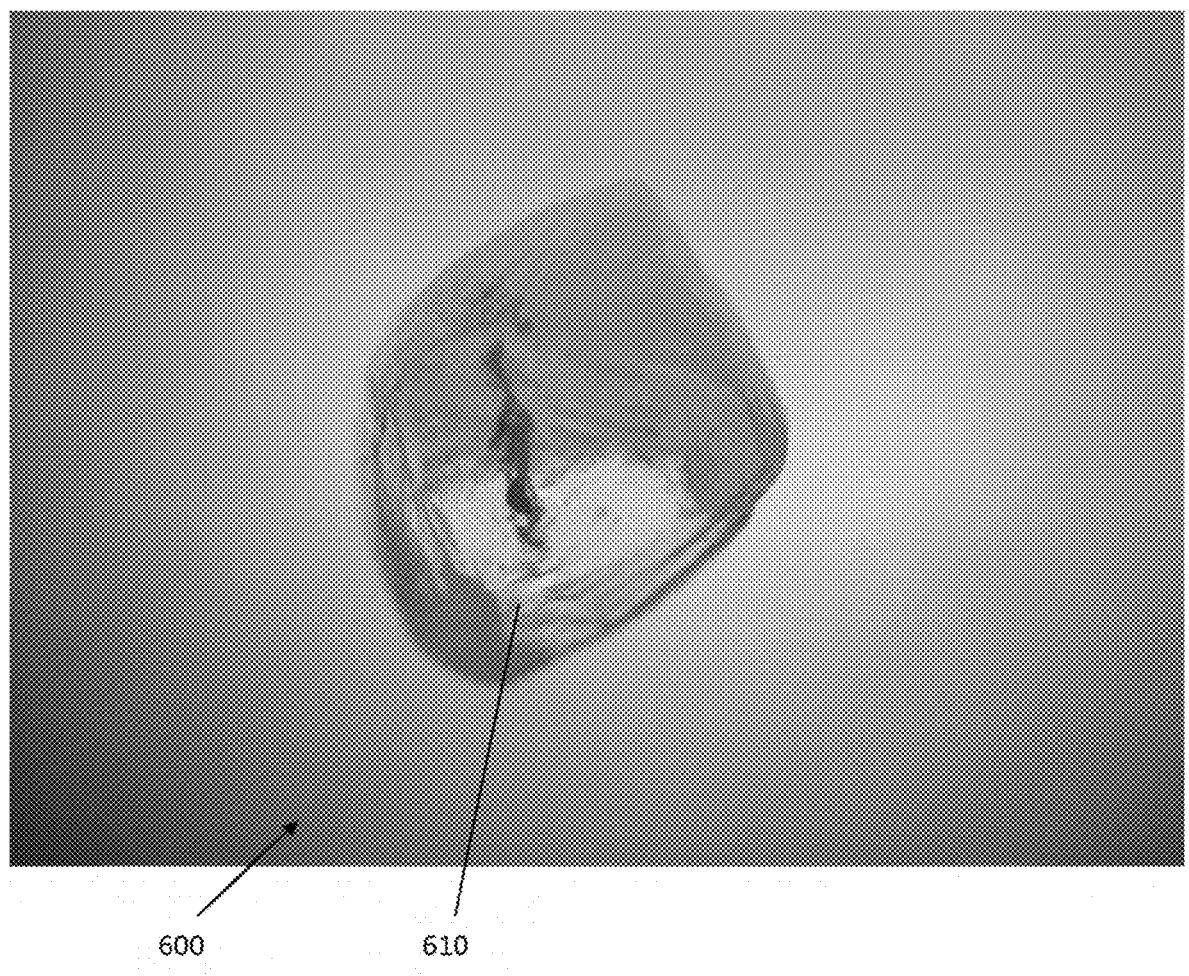
FIG. 6a shows an image of a diamond without flat-field correction.
Figure 6B:
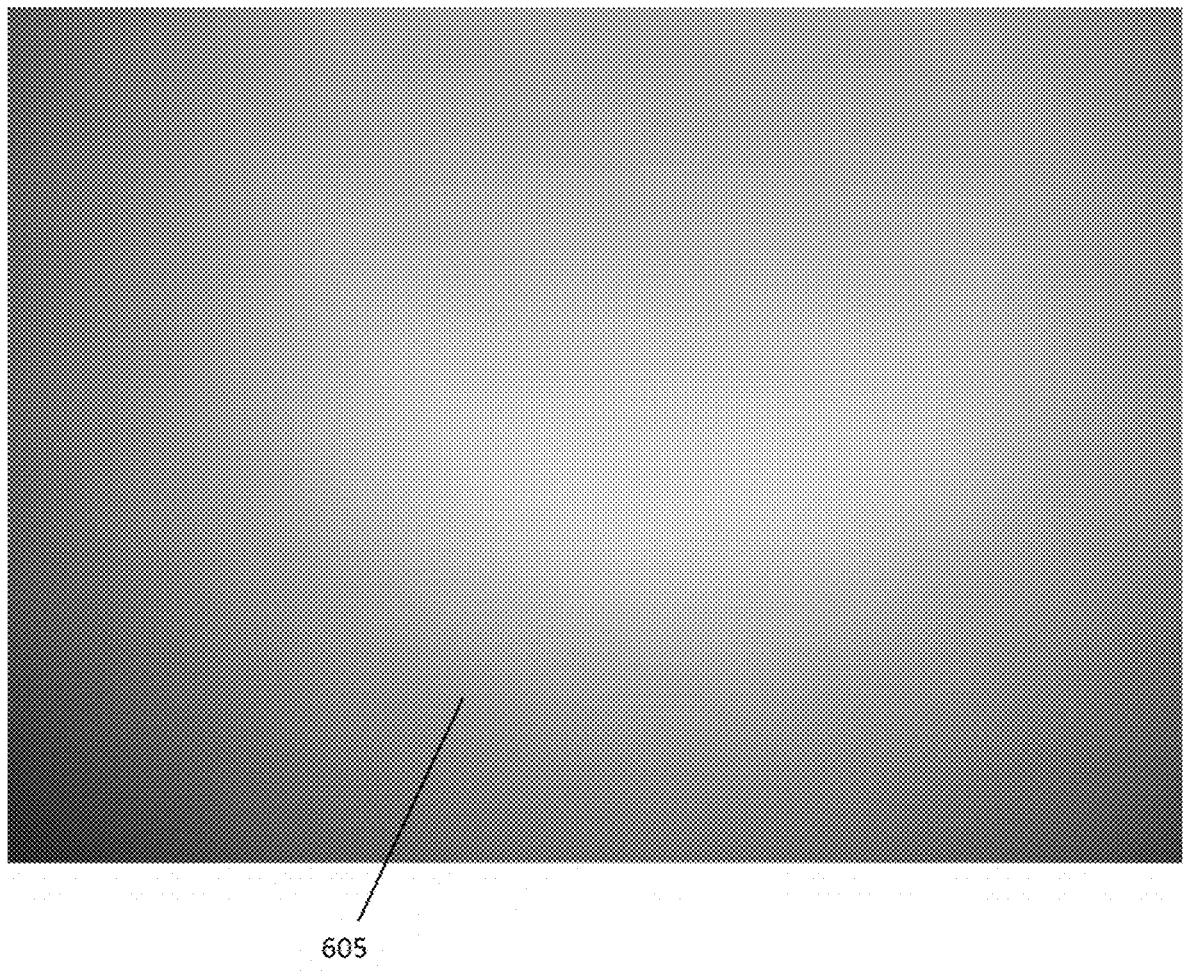
FIG. 6b shows a flat field image.
Figure 6C:
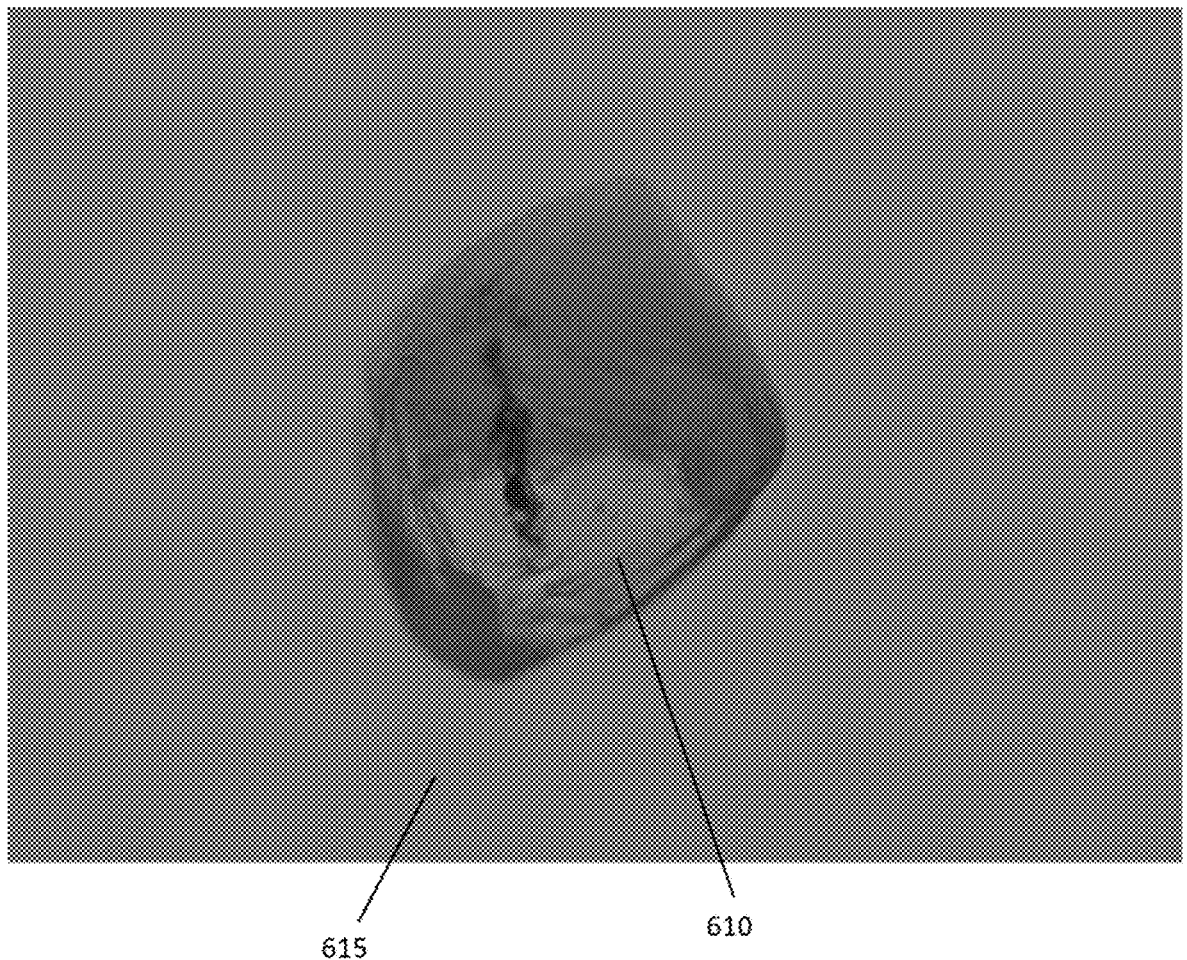
FIG. 6c shows a flat-field corrected image of the diamond of FIG. 6a with uniform brightness and background.

By way of a further example, FIG. 5a shows a photographic representation of axial images of a diamond 500 wherein the axial images are in the direction of towards the table of the diamond 500 with high exposure with over exposed features at the reflecting facet, FIG. 5b shows a photographic representation of an image of the diamond 500 of FIG. 5a with low exposure, FIG. 5c shows a photographic representation of an image of the diamond of FIG. 5a with very low exposure, and FIG. 5d shows a photographic representation of an image of the diamond of FIG. 5a-5c with focus combined preserve the features at the reflecting facets;

By way of another example, FIG. 6a shows axial images of a diamond 600 wherein the axial images are in the direction of towards the table of the diamond 610 without flat-field correction; FIG. 6b shows a flat field image 605; and FIG. 6c shows a flat-field corrected image 615 of the diamond 610 of FIG. 6a with uniform brightness and background.

Such a process implemented in a machine system of the present invention, without the problem of vision tiredness of humans, and having algorithm for analyzing the defects, provides an improved and advantageous alternative with high repeatability in comparison with the prior art.

The system and process of the present invention also reduces the cost and time to produce master stone sets and train a professional gemologist. This can also reduce the time to train a professional gemologist in clarity grading.

Due to the visual nature of clarity and inherent variance, the assessment of clarity of a diamond needs to be done in a controlled environment. This makes ensures the lighting conditions and the background for every diamond are the same, as provided by the present invention.

Moreover, the controlled environment must be repeatable at different locations such that people at different location can still have the same assessment on diamond clarity, which the present invention provides.

A system of integrating spheres, as utlised in preferred embodiments of the present invention, assists in playing this role as the light intensity, spectrum and uniformity can be well controlled and repeated, and as such, the system of the present invention can serve and provide for clarity assessment.

What is claimed:

1. A process operable using a computerized system for grading the clarity of a diamond, the computerized system including an optical image acquisition device, a processor, a pre-trained neural network and an output module operably interconnected together, said process including the steps of:
   (i) acquiring via an optical image acquisition device one or more plurality of axial view images of a diamond with different focus depths, wherein the focal depths are determined by the height of the diamond and the plurality of axial view images are acquired in an environment having a predetermined constant light level, and wherein the axial view is defined as a view towards the diamond in a direction of a central axis normal to the table of the diamond and passing through the apex of the pavilion of the diamond, and the height of the diamond is defined as the length of the central axis of the diamond,
   (ii) in a processor, combining the plurality of axial views to form one or more single optical images, wherein the one or more single optical images comprise in-focus defects from the plurality of axial views and such that out of in-focus defects from the plurality of axial views within the diamond are rejected;
   (iii) in a pre-trained neural network, providing a regressive value associated with the clarity grade of said diamond based on the one or more single optical images acquired during step (ii); wherein the pre-trained neural network has been pre-trained utilising one or more single optical images acquired from a plurality of diamonds each having a pre-assigned clarity grade assigned thereto and wherein the one or more single optical images acquired from a plurality of diamonds are provided by the same process of step (i), and acquired in an environment having a predetermined constant light level the same as that as (i); and
   (iv) from an output module, providing a clarity grade to the diamond of (i) by correlating the regressive value from (iii) to a clarity grade.

2. A process according to claim 1, wherein the height of the diamond is determined by an optical image acquired via a further optical image acquisition device located normal to the central axis of the diamond.

3. A process according to claim 1, wherein different focus depths are corrected with the refractive index of the diamond.

4. A process according to claim 1, wherein the apparent focus depth $D_{apparent}$ for focusing is corrected according to the formula:

$$D_{apparent} = \frac{D_{real}}{n_{diamond}}$$

wherein $n_{diamond} \approx 2.42$.

5. A process according to claim 1, wherein said predetermined constant light level is a colour temperature of 6500K.

6. A process according to claim 1, wherein the plurality of axial view images of a diamond is acquired within a system of integrating spheres.

7. A process according to claim 1, wherein a light source for providing said predetermined light level is selected from the group including an LED (Light Emitting Diode) light source, a Xenon lamp light source, and incandescent light source, and fluorescent lamp light source, a solar simulator or the like.

8. A process according to claim 1, wherein the optical image acquisition device is a digital camera, a monochromatic or polychromatic device.

9. A process according to claim 1, wherein a plurality of axial view images of the diamond are acquired about said central axis, and wherein a plurality of axial view images of said plurality of diamonds are acquired about said central axis.

10. A process according to claim 1, wherein the one or more plurality of axial view images of the diamond are acquired utilising High Dynamic Range (HDR) techniques, and wherein the one or more plurality of axial view images of said plurality of diamonds are acquired utilising High Dynamic Range (HDR) techniques.

11. A process according to claim 1, wherein flat field correction is utilized in the acquisition of the one or more plurality of axial view images of the diamond, and wherein flat field correction is utilized in the acquisition of the one or more plurality of axial view images of said plurality of diamonds.

12. A process according to claim 1, wherein the axial view of the diamond is a view in the direction towards the table of the diamond.

13. A process according to claim 1, wherein the axial view of the diamond is a view in the direction towards the pavilion of the diamond.

14. A computerized system for grading the clarity of a diamond as a function of internal defects within the body of the diamond, the computerized system including an optical image acquisition device, a processor, a pre-trained neural network and an output module operably interconnected together, said process including the steps of:
 (i) optical image acquisition device for acquiring one or more plurality of axial view images of a diamond with different focus depths, wherein the focal depths are determined by the height of the diamond and the plurality of axial view images are acquired in an environment having a predetermined constant light level, and wherein the axial view is defined as a view towards the diamond in a direction of a central axis normal to the table of the diamond and passing through the apex of the pavilion of the diamond, and the height of the diamond is defined as the length of the central axis of the diamond,
 (ii) a processor in communication with the image acquisition device, for combining the plurality of axial views to form one or more single optical images, wherein the one or more single optical images comprise in-focus defects from the plurality of axial views and such that out of in-focus defects from the plurality of axial within the diamond are rejected;
 (iii) a pre-trained neural network in communication with the processor and providing a regressive value associated with the clarity grade of said diamond based on the one or more single optical images acquired of said diamond by the optical image acquisition device, wherein the pre-trained neural network has been pre-trained utilising one or more single optical images acquired from a plurality of diamonds each having a pre-assigned clarity grade assigned thereto and wherein the one or more single optical images acquired from a plurality of diamonds are provided by the same process of step (i), and acquired in an environment having a predetermined constant light level the same as that as (i); and
 (iv) an output module in communication with the pre-trained neural network and for providing a clarity grade to the diamond of by correlating the regressive value to a clarity grade.

15. A computerized system according to claim 14, further comprising a light source for providing said predetermined constant light level is a colour temperature of 6500K.

16. A computerized system according to claim 14, wherein the light source is selected from the group including an LED (Light Emitting Diode) light source, a Xenon lamp light source, and incandescent light source, and fluorescent lamp light source, a solar simulator or the like.

17. A computerized system according to claim 14, further comprising system of integrating spheres, in which the diamond is located when the at least a first optical image is acquired.

18. A computerized system according to claim 14, further comprising a rotational platform rotatable about said central axis and within the system of integrating spheres, wherein the rotational platform provides for rotation of the diamond about the central axis such that a plurality of optical images of the diamonds can be acquired by the optical image acquisition device.

19. A computerized system according to claim 14, wherein the optical image acquisition device is a digital camera, monochromatic device or a polychromatic device.

20. A computerized system according to claim 14, further comprising a further optical acquisition device for acquiring an optical image of a side view of the diamond so as to provide for ascertaining the height of the diamond.

21. A computerized system according to claim 14 wherein the axial view of the diamond is a view in the direction towards the table of the diamond.

22. A computerized system according to claim 14 wherein the axial view of the diamond is a view in the direction towards pavilion of the diamond.

23. A report indicative of the grading the clarity of a diamond, wherein the clarity grading of the diamond has been provided by the process according to claim 1.

* * * * *